United States Patent [19]
Chen et al.

[11] Patent Number: 5,337,396
[45] Date of Patent: Aug. 9, 1994

[54] CONDUCTIVE PLASTIC OPTICAL-ELECTRONIC INTERFACE MODULE

[75] Inventors: Bor U. Chen, Studio City; Mehrdad Ghorbanali, Los Angeles; Jack B. Buck, Simi Valley, all of Calif.

[73] Assignee: Optical Communication Products, Inc., Chatsworth, Calif.

[21] Appl. No.: 7,980

[22] Filed: Jan. 22, 1993

[51] Int. Cl.$^5$ ............................................. G02B 6/42
[52] U.S. Cl. ....................................... 385/92; 385/88; 385/94
[58] Field of Search ................. 385/88, 92, 93, 94; 220/DIG. 4, DIG. 19, 352, 353

[56] References Cited

U.S. PATENT DOCUMENTS

| | | | |
|---|---|---|---|
| 1,093,735 | 4/1914 | Shapiro | 220/DIG. 19 X |
| 4,979,787 | 12/1990 | Lichtenberger | 385/88 |
| 5,011,246 | 4/1991 | Corradetti et al. | 385/92 |
| 5,082,338 | 1/1992 | Hodge | 385/81 |
| 5,155,786 | 10/1992 | Elker et al. | 385/88 X |

OTHER PUBLICATIONS

"RF Absorption by Submicron Metallic Particles", William A. Janos, Report Prepared for Office of Naval Research, 31 Aug. 1981, pp. 1-2.

Primary Examiner—Rodney B. Bovernick
Assistant Examiner—Hemang Sanghari
Attorney, Agent, or Firm—A. M. Fernandez

[57] ABSTRACT

A conductive plastic optical-electronic interface incorporates a rigid double-sided printed circuit board (PCB) for small compact size design with surface mount technology in a small sixteen pin dual-in-line housing with a protruding receptacle for a ferrule at the end of a fiber-optic cable. The conductive plastic housing is injection molded in three parts using a mixture of conductive fibers and plastic chosen for RFI/EMI shielding. The PCB slides into slots in a frame for the housing for mechanical rigidity and a base and lid seal the PCB in the housing. A rubber cup may be placed over the receptacle to seal against environmental conditions while soldering and cleaning the dual-in-line sixteen pin package to a system printed circuit board. The design is suitable for all the bit rates using single or multimode fiber and applicable to all wavelengths.

3 Claims, 3 Drawing Sheets

CONDUCTIVE PLASTIC OPTICAL-ELECTRONIC INTERFACE MODULE

BACKGROUND OF THE INVENTION

This invention relates to packaging of an optoelectronic element and, more particularly to such packaging for an optical-electronic interface module having a multipin housing made of conductive plastic. A rigid double-sided printed circuit board (PCB) enclosed in the housing couples the optoelectronic element to pins protruding from the housing.

Fiber optic technology is widely used in conjunction with electronic circuits for a variety of applications. It is most favorable in the field of communications since fiber-optic transmissions are less susceptible to radio-frequency interference (RFI) and electromagnetic interference (EMI) that is not of a sinusoidal character as compared to electronic transmissions, and data rate for digital transmission can be much higher through optical fibers.

The coupling between optical fibers and electronic circuits has posed numerous problems. Due to the relatively low amount of power used in transmission and reception of signals through optoelectronic elements, the leads to and from the device are susceptible to EMI, which may so mask the electronic signal as to make the information received and/or transmitted unreliable. Also, long leads limit the maximum bit rate of both transmission and reception due to parasitic inductance and capacitance of the leads. Therefore it is necessary to have the optoelectronic element and the receiving and/or transmitting electronic circuit as close to each other as possible with effective shielding against EMI. Optoelectronic devices and interfacing electronic circuits are therefore preferably housed in the same package.

Many different packages have been designed to solve the common problems discussed above. U.S. Pat. No. 4,647,148 discloses a prior-art fiber optic receiver in a metal housing 12 that slips into a metal case 19. Such a package provided effective EMI shielding but presented other problems, namely parasitic inductance and capacitance of input and output leads. In addition to the problem of such parasitic impedance, there was a problem of sealing circuit components against moisture. Moreover, precision fabrication required of the metal housing 12, case 19 and receptacle 17 in order to have proper mating of various parts added to the costs of packaging. To overcome the parasitic impedance problem, the prior-art package having long input leads and four output leads described in that patent was superseded by a dual-in-line multipin package with a one-sided PCB. To then provide shielding for all elements from EMI, the PCB was formed on a ceramic substrate with a seal ring 22 mounted on a metal plate 29. A conductive shell seam welded onto the seal ring 22 completed what is equivalent to the prior-art housing 12. A metal cover 34 was then placed over the entire assembly comprising the PCB with a seal ring on a metal plate, a conductive shell over the seal ring, and a receptacle 28 with an optoelectronic device 20 in a sealed can 27. This provided airtight sealing for the PCB coupling.

U.S. Pat. No. 4,911,519 discloses a plastic frame 52 for a dual-in-line integrated circuit package 66 and an optical transmitter and/or receiver assembly 60. To provide EMI shielding, a metal plate 75 and metal cover 76 were used to protect the optoelectronic element. That packaging relied upon a sealed integrated circuit (IC) package and was therefore limited to the IC function that can be provided within the sealed IC package.

U.S. Pat. No. 4,979,787 discloses a nonconductive plastic housing for an optical-electronic interface module with a folded printed circuit board to increase the circuit board area on the one side that is folded in to accommodate more integrated circuits for more signal conditioning functions and a metal film on the outer surface of the folded PCB for EMI shielding. This module was an improvement over the prior art in that it allowed more circuit functions to be housed close to the optoelectronic element without increasing the footprint of the housing, although still having some problems, such as failure in the connections from one part of the folded circuit board to another as a result of folding the circuit board and placing it in the plastic housing after fabrication. Therefore, the need still exists for a well shielded, cost effective, miniature package for housing optoelectronic elements with more complex interfacing integrated circuit functions.

STATEMENT OF THE INVENTION

In accordance with the present invention, an optical-electronic package is provided for use in interfacing the end of a fiber-optic cable and an optoelectronic element connected to an electronic system designed to receive or transmit optical signals. The package housing comprises a conductive plastic frame having two side walls and two end walls, a lid, and a base. The conductive plastic has a nonconductive surface and is formed using a mixture of conductive fibers, such as carbon fibers or stainless steel fibers with a plastic compound, such as polyphenylene sulfide (PPS). Upon injection molding the three parts of the conductive plastic housing, the nonconductive plastic encapsulates the conductive fibers leaving a uniform nonconductive surface. One end wall of the conductive plastic frame is molded around a metal receptacle for receiving a ferrule at the end of a fiber-optic cable. There the metal of the receptacle does form an electrical connection with the conductive plastic through physical contact between the conductive fibers and the metal receptacle. An electrical connection thus exists between the metal receptacle and the conductive plastic housing. The receptacle in turn receives and securely holds an optoelectronic element at one end with element leads protruding from the receptacle into the frame.

A rigid printed circuit board (PCB) with double-sided surface mount technology to reduce size is provided with one or more layers of substrate and multiple conductive patterns. The double-sided PCB has electronic components electrically connected to etched conductive patterns on its two outer surfaces and interconnected through the PCB as needed, and electrically connected as needed to pins protruding from both sides but protruding more from one side of the PCB than the other. The two side walls of the frame each have a longitudinal slot on their inner surface parallel to their edges to receive the rigid printed circuit board, and one end wall (hereinafter referred to as a "short end" wall opposite the end wall having molded in it the receptacle for the optoelectronic element) extends up between the two side walls only a fraction of the height of the two side walls so that the double-sided PCB may be slid into the slots on the inner surfaces of the two side walls of the frame with the pins of the PCB protruding from both sides. The short protrusions from the PCB clear the short end wall, and the long protrusions of the pins extend out beyond the edges of the side walls. A base having holes for the pins is then placed over the frame. The base also has an end folded down to fit over the short end wall of the frame with the end of folded down portion fitting into a slot on the upper edge of the short end wall of the frame. The lid is then placed over the frame to enclose the PCB within the housing made of conductive plastic. The three parts of the housing are secured and sealed together with conductive epoxy.

The double-sided PCB has conductive connecting pads for electrical connection to leads of the optoelectronic element. One of the leads connected to one pad provides a circuit ground (common potential plane) connection that shields the electro-optic device. The exposed lead length from the optoelectronic element to the double-sided PCB conductive pads are minimized in order to minimize parasitic impedance while the conductive plastic housing provides shielding of the leads from externally generated RFI/EMI.

The frame is closed on one side by a base plate of conductive plastic having holes for the longer protrusions of the PCB pins and an end portion perpendicular to the plane of the holes to cover the space between side walls not covered by the short end wall. The double-sided PCB has on one surface thereof conductive edge patterns along opposite sides that are not connected to either of the conductive patterns of the double-sided PCB but are connected to some of the pins of the double-sided PCB which are hereinafter referred to as "case pins." These case pins are intended to be connected through a system printed circuit board (not shown) to a ground potential referred to hereinafter as the "system common potential plane." These conductive edge patterns are electrically connected to the front metal receptacle on the end wall at the corners of the frame using conductive epoxy to provide a case ground (common potential plane). This method of RFI/EMI shielding is especially cost-effective since injection molding can be used to produce the conductive plastic parts, which is relatively inexpensive as compared to the cost of manufacturing metal parts.

Once assembly is complete, and before the optoelectronic package is inserted into a pin connector on a system printed-circuit board, a rubber cup is placed over the end of the receptacle that receives the ferrule for the fiber-optic cable to seal the optoelectronic element. The internal diameter of the cup is smaller than the outer diameter of the receptacle to assure that seal, and has an annular recess at the bottom of the cup to accommodate locking nibs protruding from the ferrule. This cup protects the optoelectronic element in the receptacle during any soldering and cleaning process that may be used in assembling the system printed circuit board. The novel features that are considered characteristic of this invention are set forth with particularity in the appended claims. The invention may be better understood from the following description of a preferred embodiment with reference to the accompanying drawings.

DESCRIPTION OF THE PREFERRED EMBODIMENTS

Figure 1:
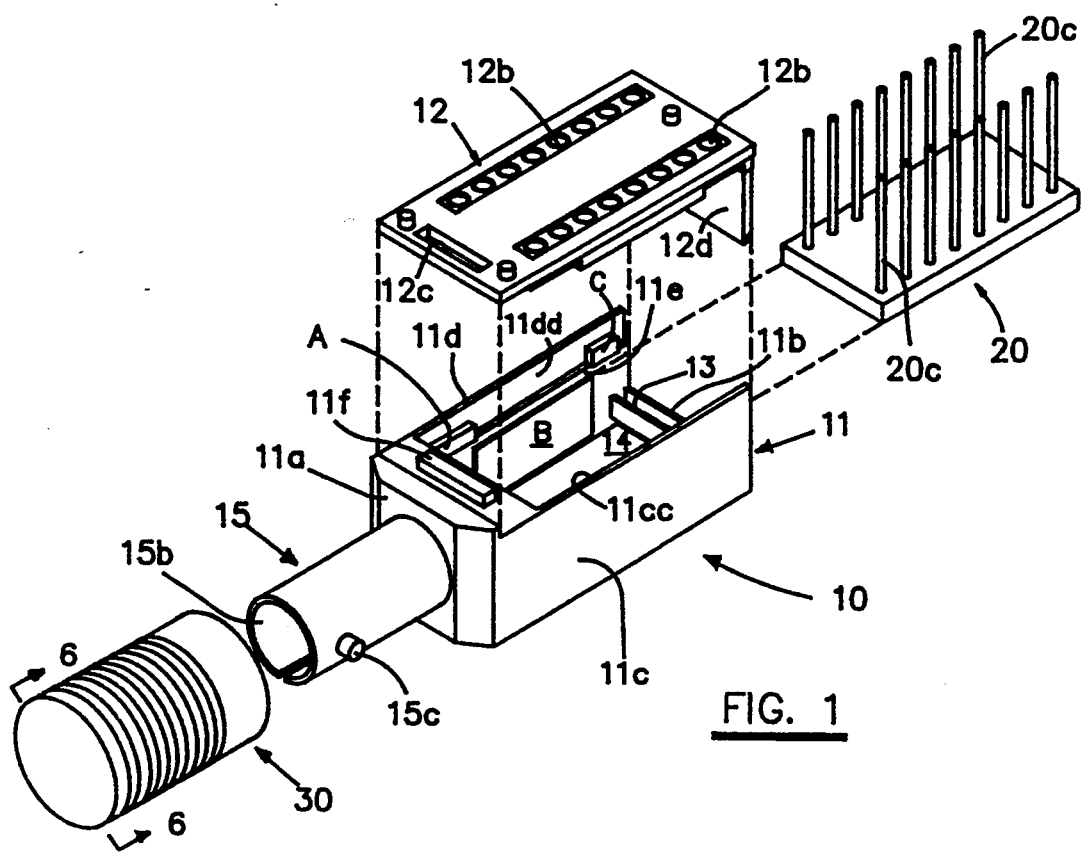
FIG. 1 is an inverted exploded view of an optical-electronic interface connector having a frame, a base with a perpendicular end portion and a double-sided PCB with pins protruding out of the housing, and a rubber cup for use in covering a receptacle of the interface connector during any soldering and cleaning process for the system board on which the pins are connected.
Figure 2:
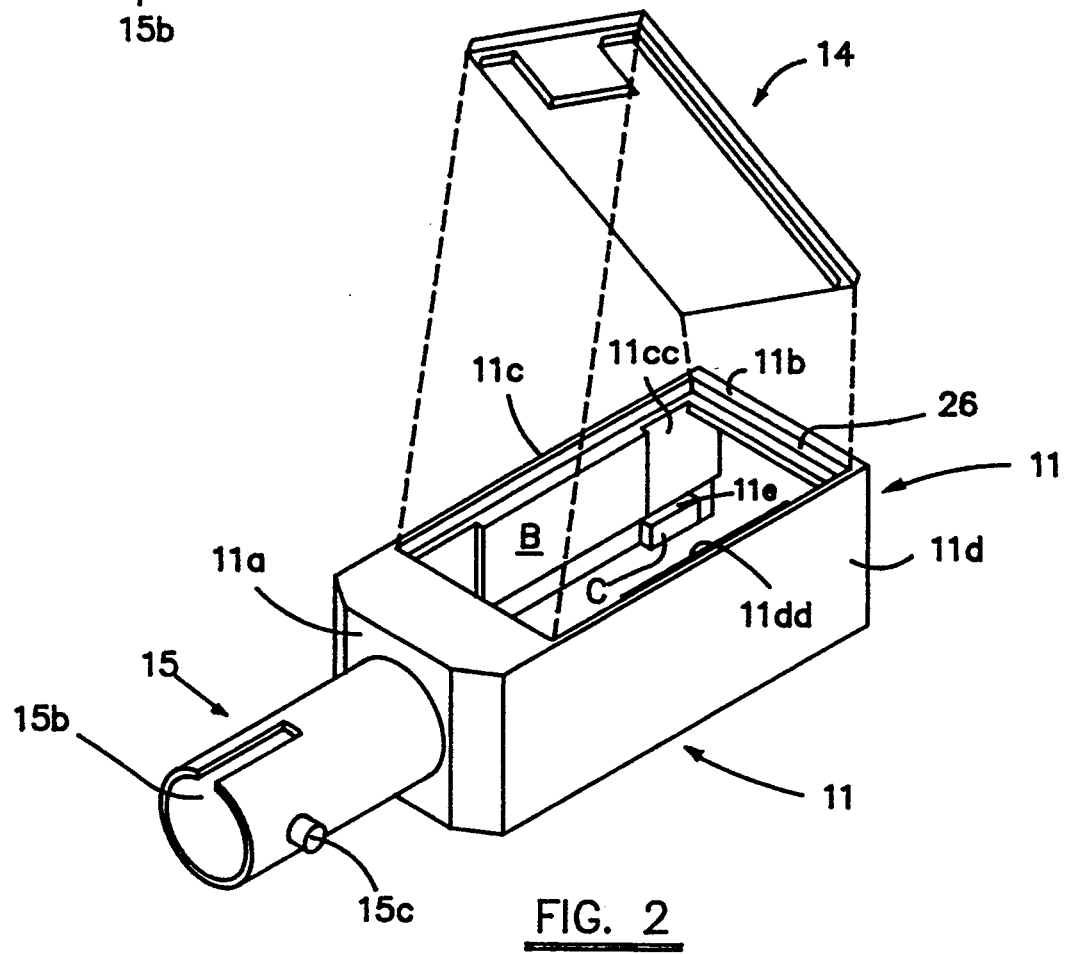
FIG. 2 is an upright view of the optical-electronic interface connector housing without either the double-sided PCB or the base, and having its lid lifted off.

Referring to FIG. 1, which shows in an inverted position an exploded view of an optical-electronic interface connector in accordance with the present invention. It comprises a housing 10 fabricated out of conductive plastic having a rectangular frame 11, a base 12 that fits the frame, the base having a folded back end 12a to fit in an edge groove 13 in a short end wall 11b of the frame 11 and having holes 12b. A cover 14, better shown in FIG. 2, snaps in between the side walls and the end walls of the frame 11.

The three parts of the housing are injection molded separately using a nonconductive plastic permeated with conductive fibers, such as stainless steel fibers. The surfaces of the injection molded parts are nonconductive, but the parts are internally conductive since the conductive fibers in the nonconductive plastic will be randomly connected together wherever they are physically in contact with each other. In any case, the randomly distributed conductive fibers will absorb the RFI/EMI energy and dissipate it as heat through the PCB pins. These three parts thus form three electromagnetic interference shields, and although there is not electrical conduction between them, they provide effective RFI/EMI shielding because the very small gaps between them are sealed with conductive epoxy.

Figure 3:
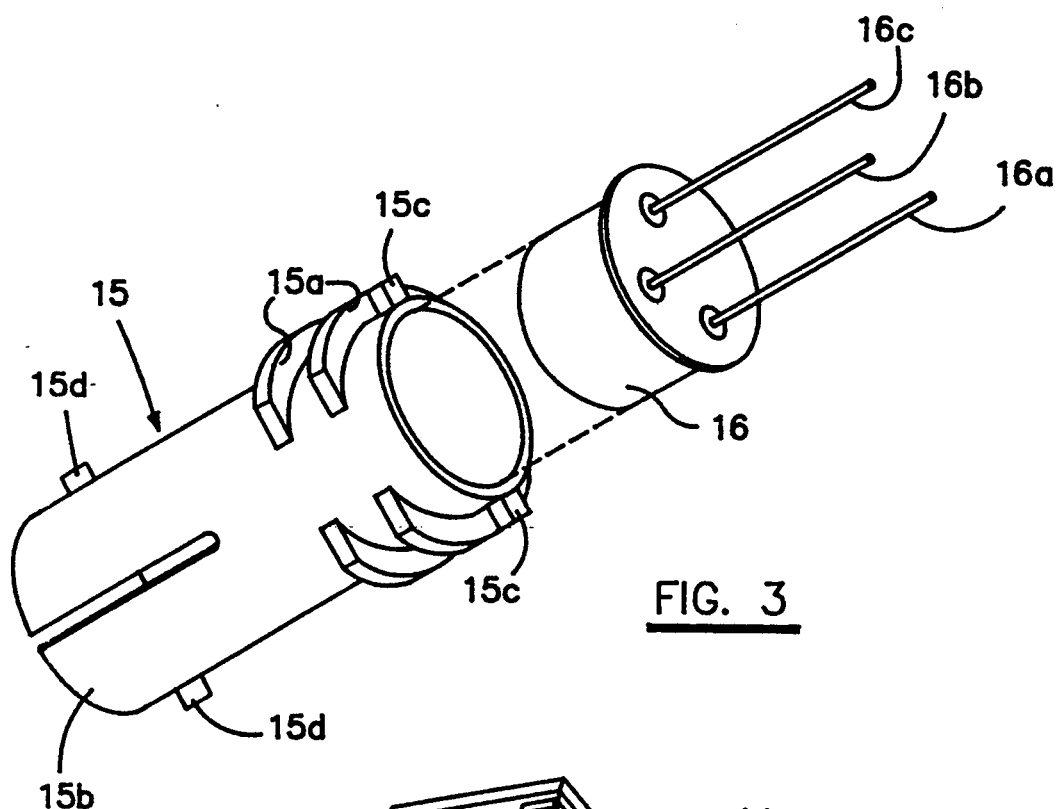
FIG. 3 is an isometric view of a metal receptacle having a ferrule receiving end and opposite that end a bore that receives an optoelectronic element.

At one end of the frame 11, an end wall 11a is preferably made thicker than an opposite, short end wall 11b and sides 11c and lid to securely hold a metal receptacle 15 shown separately in FIG. 3. The receptacle 15 has ridges 15a at one end that is molded in the end wall 11a to securely hold it and an optoelectronic element 16 (a photodetector for reception or photoemitter for transmission) with element leads 16a, 16b and 16c protruding from the receptacle as shown in FIG. 3. The metal receptacle 15 also has a receiving end 15b for a fiber-optic connector ferrule (not shown). In addition, the metal receptacle 15 has metal tabs 15c protruding to the sides in order to facilitate connecting the receptacle to certain pins of the PCB as will be described below.

Figure 4:
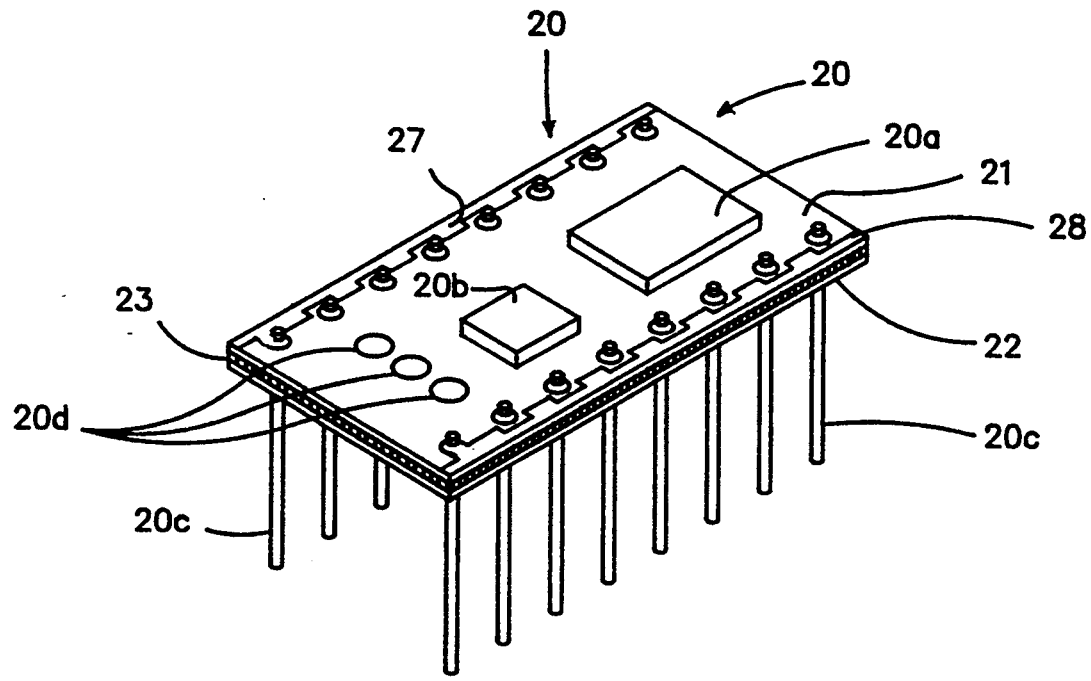
FIG. 4 shows a multi-layered double-sided PCB with pins protruding in both directions and having (1) electronic devices connected to printed circuit patterns on both sides, and (2) connector pads on the top side shown for connecting the optoelectronic element shown in FIG. 3.

Before affixing base 12 to the housing frame 11 in FIG. 1, a double-sided printed circuit board (PCB) 20 is prepared as shown in FIG. 4 with one or more integrated circuit packages 20a and other devices 20b shown mounted on one surface interconnected by a conductive pattern (not shown) etched in a conventional manner in conductive films 21 and 22 on both sides of the PCB 20. In practice, the PCB 20 may have many insulating layers and conductive film patterns that are insulated from each other and interconnected through pins or feed-through holes as needed. The pattern etched in the outer conductive films 21 and 22 are indicated in FIG. 4 to be separated by a nonconductive board 23 comprising two layers of a suitable insulating material and a nonconductive core for rigidity.

The PCB 20 has, for example, sixteen pins 20c protruding out of both surfaces. Some of these pins are connected on both sides of the PCB 20 to the conductive film patterns 21 and 22 as needed. The pins extend further on one side of the PCB 20 in order that they will extend out beyond the sides 11c and 11d of the frame and through holes in the base 12 once the PCB is inserted into the housing, and the base 12 is placed on the frame 11.

Each of the inner walls 11cc and 11dd of the frame 11 effectively have a groove 11e which is slightly greater in width than the thickness of the PCB 20. That groove is formed in each of the inner walls by molded blocks A, B and C. The small blocks A and C are molded near one edge of the frame 11 and the large wide block B between them is molded near the opposite edge of the frame. The vertical spacing of the block B with respect to the blocks A and C thus forms the groove 11e for the PCB. It will be appreciated that the blocks A and C may be extended horizontally until they form one integral block AC, and that the block B may be extended horizontally in both directions to form a longer block equal in length to the integral block AC, thus forming a more explicit groove 11e for the PCB 20.

Once the PCB 20 is slid into the groove 11e formed by the blocks A, B and C of the frame 11 from the end opposite the receptacle 15 with the pins 20c extending upwardly as shown in FIG. 1, separate connector pads 20d shown in FIG. 4 on conductive layer 21 of the PCB 20 are electrically connected to leads 16a, 16b and 16c of optoelectronic element 16 previously inserted in the receptacle 15. In addition to electrically connecting the PCB to leads 16a, 16b and 16c, the PCB is electrically connected to the tabs 15c of the receptacle 15 (FIG. 3) to conductive strips 27 and 28 (FIG. 4) of the PCB at corner points 24 shown in FIG. 5 using conductive epoxy. Nonconductive epoxy is applied to points 25 to further securely fix the PCB in the frame 11. The base 12 is then placed with its sixteen holes 12b over the sixteen pins 20c and affixed to the frame 11 with conductive epoxy applied in the groove 13 in the short end wall 11b of the frame 11 to affix the back end portion 12a of the base 12 and nonconductive epoxy applied in holes 12b of the base 12 to secure the base 12 to the pins 20c. Note in FIG. 1 that a rectangular recess is molded in the base 12 around the two in-line set of eight holes 12b. That recess can be filled with nonconductive epoxy that is viscous so that when it is poured into the recesses it will not run down the pins 20c to the PCB 20. A slot 12c in the base 12 fits over a block 11f molded on top of the end 11a of the frame 11. Conductive epoxy is applied around the block 11f in this slot 12c and nonconductive epoxy is applied around the base 12 on the frame 11 to provide both a good case ground and a moisture seal. The lid 14 is then placed on a seat 26 (FIG. 2) of the frame 11 with conductive epoxy.

Figure 5:
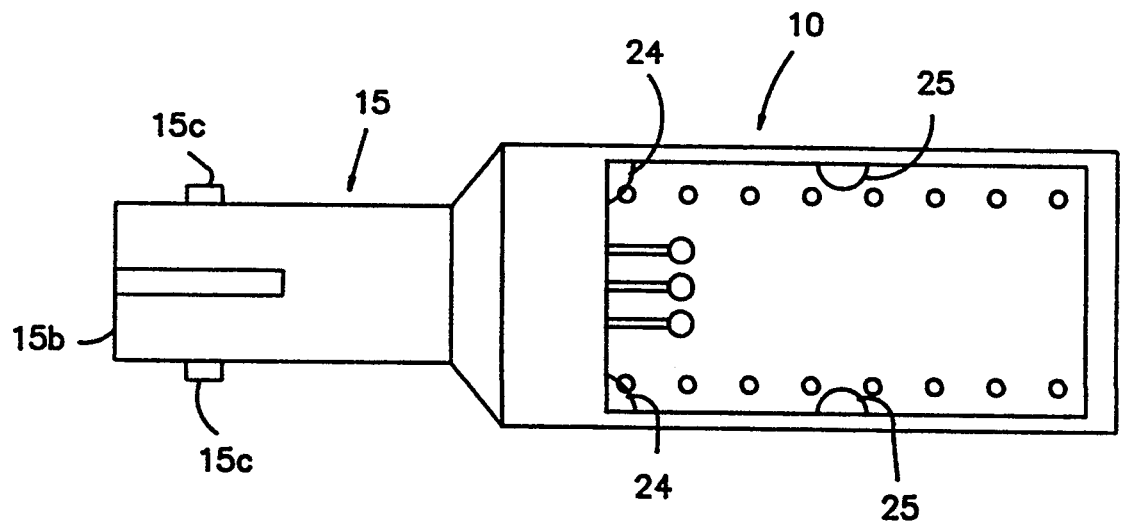
FIG. 5 is a plan view of the optical-electronic interface connector housing with the double-sided PCB inserted therein and the lid shown in FIG. 2 removed.

Before seating and affixing the lid 14 on the frame 11, conductive strips 27 and 28 along the sides of the PCB are electrically connected to some of the pins 20c, such as the first pin on the left of each in-line set of pins shown in FIG. 4, and electrically connected to the frame 11 by conductive epoxy at points 24 shown in FIG. 5 to assure that the conductive plastic housing is everywhere at the same ground potential (system common potential plane) as is provided for the PCB through case pin connections.

Although the optical-electronic interface module described and illustrated in the drawings is intended to be an ST connector with a photodetector or photoemitter in a TO can, it may in practice be other than an ST connector. What is important is that RFI/EMI shielding be provided for the interface circuitry desired on the PCB. In practice, the conductive plastic housing 10 is connected to the edge conductors of the PCB and some of the pins 20c (case pins). The plastic housing 10 is in turn connected to the tabs 15c of the receptacle 15, as noted hereinbefore. One pin 16a of the electro-optical element 16 is connected to a connector pad 20d that is electrically connected to a case pin that provides a case ground connection to the system utilizing this interface connector module.

The user of this interface connector module then connects one of the other two pads 20d to one of the sixteen connector pins designated for $V_{EE}$ or $V_{cc}$ that is isolated from the connector housing 10 and to the pin 16b of the electro-optical element 16. In that manner, $V_{EE}$ or $V_{cc}$ is chosen to be at "circuit ground," i.e., at a potential plane common to the receptacle 15 and the conductive plastic frame 10 commonly referred to as circuit ground, and the entire PCB and leads between the optoelectronic element and the PCB are RFI/EMI shielded in the environment of the module. The remaining pin 16c of the electro-optical element 16 is connected to a connector pad 20d that is connected to the printed circuit pattern (not shown) etched in the conductive film 21. That remaining pin thus serves as the signal path between the electro-optical element 16 and the PCB.

Figure 6:
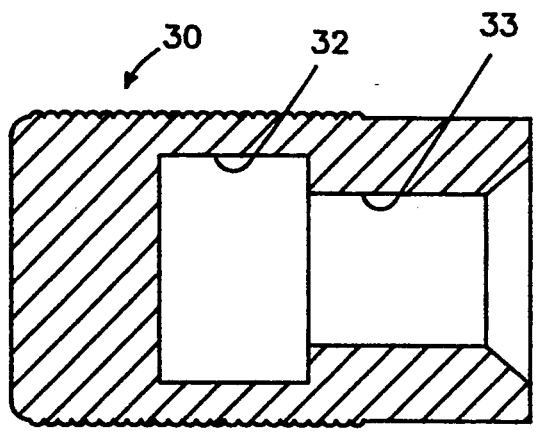
FIG. 6 is a cross section (along a line 6—6 of FIG. 1) of a rubber cup/shown in FIG. 1 for sealing a ferrule receiving receptacle.

Once the module is assembled, a vinyl cap (not shown) is placed over the receptacle for storage, but when it is plugged into a system circuit board, the vinyl cap is replaced by a rubber cup 30 shown in FIG. 1 having an internal diameter slightly less than the external diameter of the receptacle 15 so that the rubber cup 30 will fit tightly over the receptacle 15 to protect it during any soldering, cleaning, or other fabrication process that follows. The vinyl cap normally provided for storage will not suffice because nibs 15d on the receptacle 15 will cause the vinyl cap to be deformed from a cylinder into an oval shape over the receptacle, thus allowing fluids (liquids and/or gases) to enter the receptacle and damage or contaminate the optoelectronic element 16. To prevent a similar deformation of the rubber cup 30, it is made of rubber and provided with an annular recess 32 at the bottom of the cup (as shown in a cross section in FIG. 6) that will accommodate the nibs 15c. Once the rubber cup is stretched over the nibs 15c and seated over the receptacle 15, the nibs 15c will be positioned in the annular recess 32 of the rubber cup 30, and the forward portion 33 of the cup will be seated tightly against the cylindrical base portion of the receptacle 15 between the nibs 15 and the frame 11, thus providing a seal against any fluid during any soldering, cleaning, or other fabrication process. When the module thus illustrated and described is placed in use as an interface between an optoelectronic element 16 in the metal receptacle 15 connected to the housing 10 and an electronic system (not shown), the rubber cup 30 is removed from the fiber-optic connector end 15b that received a ferrule (not shown).

We claim:

1. A module for providing an interface between an optoelectronic element and an electronic system, said optoelectronic element having leads extending therefrom, and said module comprising a housing having walls made of injection molded parts using a mixture of nonconductive plastic material and conductive fibers, whereby said conductive fibers mixed in said plastic material are encapsulated in nonconductive plastic material such that the surfaces of said walls of said housing are nonconductive, but said walls will absorb electro-magnetic radiation to provide EMI shielding of the interior of said housing, a metal receptacle connected to said housing having one end for receiving an external fiber-optic connector ferrule and an opposite end for insertion of said optoelectronic element such that said leads of said optoelectronic element extend into said housing, a rigid printed circuit board enclosed in said housing, said printed circuit board having at least one layer of nonconductive substrate and patterned conductors on both sides of said printed circuit board, electronic devices connected to at least one of said pattern of conductors, and pins passing through and protruding from both sides of said printed circuit, said pins protruding from one side of said printed circuit board sufficiently for electrical connections to be made to said patterned conductors on one side and protruding from the other side of said printed circuit board sufficiently to extend out of said housing, electrical connections between said pins and patterned conductors on said printed circuit board at points where connections are desired, and said printed circuit board having conductive pads for making connections of said optoelectronic element leads to said patterned conductors in said printed circuit.

2. A module as defined in claim 1 wherein said housing is made of conductive plastic material in three parts comprising a frame having a short end wall and grooves in side walls of said body into which said rigid printed circuit board slides when placed in said frame, said end wall being short enough to allow pins protruding a short distance from said printed circuit board to pass over said end wall, and to allow longer pins protruding from said printed circuit board to pass between said side walls, a base having holes for allowing said base to be placed over said pins extending between said side walls to protrude out of said housing, said base having a folded end for covering an opening between side walls of said frame over said short end wall and for securing said printed circuit board in said slots within said frame, and a lid over said frame on a side thereof opposite said base, said housing frame, base and lid being affixed to each other with conductive epoxy, thereby sealing any gaps between said three parts.

3. A module as defined in claim 1, wherein said metal receptacle is cylindrical in shape and includes nibs protruding perpendicular to the cylindrical axis thereof, and a rubber cup having an internal diameter slightly less than an external diameter of said receptacle for forming a seal over said receptacle, and an annular recess at the base of said cup to accommodate said nibs without deforming said cup and breaking said seal after said rubber cup has been stretched over said receptacle to a position where said annular recess is over said nibs.

* * * * *